United States Patent [19]

Iimura

[11] Patent Number: 5,179,663
[45] Date of Patent: Jan. 12, 1993

[54] DATA TRANSFER CONTROLLER

[75] Inventor: Kenji Iimura, Hitachi, Japan

[73] Assignee: Hitachi, Ltd., Tokyo, Japan

[21] Appl. No.: 884,627

[22] Filed: May 15, 1992

Related U.S. Application Data

[63] Continuation of Ser. No. 298.660, Jan. 18, 1989, abandoned.

[30] Foreign Application Priority Data

Feb. 19, 1988 [JP] Japan .................................. 63-37171

[51] Int. Cl.[5] .......................... G06F 3/00; G06F 13/32
[52] U.S. Cl. .................................. 395/250; 364/228.5
[58] Field of Search ................................ 364/200, 900

[56] References Cited

U.S. PATENT DOCUMENTS

| | | | |
|---|---|---|---|
| 4,413,319 | 11/1983 | Shultz et al. | 364/200 |
| 4,484,303 | 11/1984 | Provanzano et al. | 364/900 |
| 4,882,727 | 11/1989 | Williams et al. | 364/900 |
| 4,975,828 | 12/1990 | Wishneusky et al. | 364/200 |

Primary Examiner—Thomas M. Heckler
Assistant Examiner—John Chavis
Attorney, Agent, or Firm—Fay, Sharpe, Beall, Fagan, Minnich & McKee

[57] ABSTRACT

A data transfer controller having a plurality of data transfer channels, each having burst-number registers for prescribing the numbers of data transfer words in the individual channels, a total-burst-number register for prescribing the number of continuous data transfer words extending over at least two of the channels, and control means for performing a control for acquiring a bus mastership upon receiving a signal of the status of any of the channels capable of transferring data, for controlling the numbers of continuous data transfer words in the individual channels on the basis of the set values of the burst-number registers, respectively, and for maintaining the bus mastership for any other channel in the status capable of transferring data, until the numbers of the continuous data transfer words after the acquisition of the bus mastership reaches the set value of the total-burst-number register.

6 Claims, 3 Drawing Sheets

DATA TRANSFER CONTROLLER

This is a continuation of application Ser. No. 07/298,660 filed Jan. 18, 1989, now abandoned.

BACKGROUND OF THE INVENTION

The present invention relates to a data transfer controller in communication control device, and more particularly to a continuous data transfer control extending over a plurality of channels in a direct memory access controller which has a plurality of channels. By way of example, the present invention relates to techniques which are effective when applied to a communication control LSI that performs data transmission control in accordance with communication protocols.

As a data transfer controller for lightening the burden of a processor in a data transfer control, a direct memory access controller has heretofore been employed. This controller acquires the mastership of a bus from the processor, thereby to perform the control of data transfer with a memory and various input/output circuits in place of the processor.

In general, transfer methods based on the direct memory access controller are broadly classified into a cycle steal method wherein the controller requests the bus mastership every data transfer of one word and returns the mastership to the processor after the end of its operation; and a burst method wherein, once the controller has acquired the bus mastership, it transfers the data of a plurality of words continuously, and the processor is in a wait status or the like. In the burst method, when the period of time for which the direct memory access controller occupies the bus is prolonged limitlessly, a lowering in the operating efficiency of the processor might be incurred. It is therefore desirable to limit the number of the words which are to be continuously transferred.

In a conventional system, a plurality of peripheral devices are used, so that the direct memory access controller has a plurality of channels and can perform the data transfer control by setting the address of a transfer goal and the number of transfer words for each individual channel. Heretofore, however, any measure for correlating the data transfer controls in the individual channels has not been taken. For example, let's consider a case where, when the data transfer control is proceeding through a channel allotted to a specified peripheral device, a data transfer request is made for another channel. Even in this case, when the operation of the channel subjected to data transfer earlier is ended, the bus mastership is abandoned, and handshake interfacing for acquiring the bus mastership anew is executed.

Incidentally, an example of literature which explains a direct memory access controller having a plurality of channels is "Hitachi Microcomputer Data Book, Peripheral LSI of 8/16-Bit Microcomputer," pp. 389-442, published by Hitachi, Ltd. in September 1985.

When, in the direct memory access controller having the plurality of channels, any measure for correlating the data transfer controls in the individual channels is not taken and bus mastership aquisition controls for the respective channels are completely independent, operations for abandoning the bus mastership and for acquiring the bus mastership anew are necessitated each time the data transfer control is shifted to another channel. This has led to the problem of lowering the data transfer efficiency, and, lowering the throughput of the system.

In particular, the inventor's study has revealed the following: In a system which must transfer relevant data items over a plurality of channels, for example, a system which includes a controller for controlling communications, it is required to load from a main memory, control information necessary for the controls of the transmission and reception of data through a circuit control unit, address information necessary for the data transfer control by the direct memory access controller, etc. Further, it is required to perform a transmission process in accordance with a received content. Therefore, it is frequent cases that the operations of transferring the various control information items and the data to-be-transmitted from the main memory to the communication controller and transferring the received data to the main memory are relevant to one another. When, on such an occasion, the data transfer cannot be effected continuously over the plurality of channels, the throughput of the system lowers drastically.

SUMMARY OF THE INVENTION

An object of the present invention is to provide a data transfer controller which can transfer data continuously over a plurality of channels and which can achieve an enhanced data transfer efficiency.

The above and other objects and novel features of the present invention will become apparent from the description of this specification and the accompanying drawings.

Typical aspects of performance of the present invention are briefly summarized as follows:

A data transfer controller having a plurality of data transfer channels is provided, it further includes, burst-number registers for prescribing the amount or number of data transfer words in the individual channels. A total-burst-number register is included for prescribing the number of continuous data transfer words extending over at least two of the channels. A control means is provided i); for performing a control for acquiring a bus mastership upon receiving a signal of the status of any of the channels capable of transferring data, for ii) controlling the number of continuous data transfer words in the individual channels on the basis of the set values of said burst-number registers, respectively, and iii) for maintaining the bus mastership for any other channel in the status capable of transferring data, until the number of the continuous data transfer words after the acquisition of the bus mastership reaches the set value of said total-burst-number register.

In addition, when the data transfer controller is included in a communication control LSI which is furnished with a circuit control unit and a central processing unit, it can be coupled to said circuit control unit by a specific data transfer bus.

According to the first-mentioned expedient, the control means acquires the bus mastership in response to the status of the channel capable of transferring data, and it controls the maximum number of continuous data transfer words in each individual channel in accordance with the set value of the corresponding burst-number register. Besides, when the control means receives the signals of the statuses of two or more channels capable of transferring data, it collectively supervises the numbers of a series of data transfer words over the plurality of channels and controls the abandonment of the bus mastership so that the bus mastership may be maintained until the number of continuous data transfer words after the acquisition of the bus mastership reaches, at most, the set value of the total-burst-number register. Thus, the continuous data transfer extending over the plurality of channels is permitted, and enhancement in the data transfer efficiency is achieved.

According to the expedient in which the data transfer controller included in the communication control LSI is coupled with the circuit control unit by the specific data transfer bus, when data is transferred between the circuit control unit and the exterior of the LSI by the access control of the data transfer controller, a common internal bus inside the communication control LSI is not occupied by the data transfer, the built-in central processing unit is permitted to utilize the common internal bus at need for a communication protocol process or the like during such a data transfer. Thus, even when the frequency of data transfers for transmission, reception etc. becomes very high due to the nature of the communication control LSI, this condition is prevented from drastically lowering the operating efficiency of the built-in central processing unit.

DESCRIPTION OF THE PREFERRED EMBODIMENTS

Figure 1:
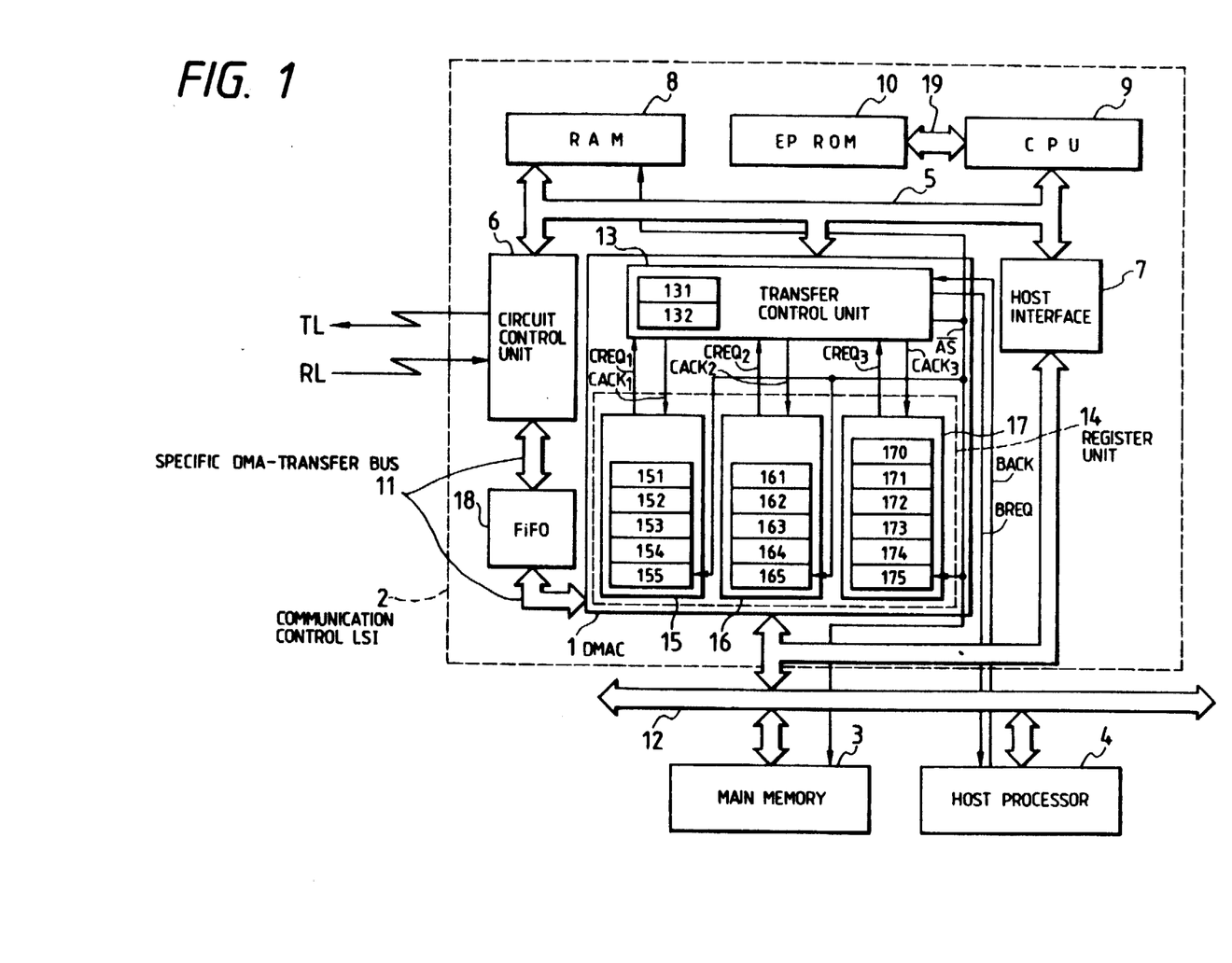
FIG. 1 is a block diagram of a system including a direct memory access controller which is an embodiment of a data transfer controller according to the present invention.

FIG. 1 is a block diagram of a system including a direct memory access controller which is one embodiment of a data transfer controller according to the present invention. Although not especially restricted, the direct memory access controller (hereinbelow, abbreviated to "DMAC") 1 shown in the figure is built in a communication control LSI 2 which is formed on a single semiconductor substrate such as silicon substrate by known techniques for manufacturing semiconductor integrated circuits.

Although no special restriction is meant, the communication control LSI 2 shown in FIG. 1 is coupled to a system bus 12 and constructs a predetermined communication function module along with, e.g., a main memory 3 for storing transmission/reception data, various parameters, etc. and a host processor 4 for governing the control of the whole system, and it supports the controls of a data transmission control procedure etc. in case of performing data communications with another communication function module which constructs a remote office.

Here, the communication control LSI 2 will be first explained as a whole.

This communication control LSI 2 includes a circuit control unit 6 which performs serial interface operations with the remote office through a transmission line TL and a reception line RL, a host interface 7 which is interfaced with the host processor 4, the main memory 3, etc., the DMAC 1 which serves to transfer data between it and the main memory 3, etc. directly without the intervention of the host interface 7, a RAM (random access memory) 8 in which various control data items, such as system constants, necessary for a data transmission control by the intervention of the circuit control unit 6, various control information items necessary for a data transfer control by the DMAC 1, etc. are stored in rewritable fashion, a CPU (central processing unit) 9 which governs the controls of the whole communication control LSI 2, and a memory 10 in which a communication protocol processing program for stipulating the data transmission control procedure in the circuit control unit 6 is set. The memory 10 for storing the protocol processing program therein is an EPROM (erasable and programmable read only memory) which is an example of a rewritable nonvolatile semiconductor memory. Accordingly, the communication control LSI 2 can set therein the desired data transmission control procedure without being restricted to specified protocols and in conformity with protocols of a different sort or the alterations of protocols, in such a way that the communication protocol processing program to be stored in the EPROM 10 is selected or altered as may be needed.

The EPROM 10 may well be replaced with an EEPROM (electrically erasable and programmable read only memory) which is electrically rewritable. In the case of adopting the EEPROM, the data transmission control procedure can be rewritten as the operation of the system. Accordingly, in a case where the circuit control unit 6 is so utilized that a link can be stretched on the basis of different protocols such as the control procedures of the series of LAPB (Link Access Procedure Balanced), LAPD (Link Access Procedure on the D channel) and any other HDLC (High level Data Link Control), it is possible to hold the selectively employable transmission control procedures outside the communication control LSI beforehand and to store the predetermined control procedure in the EEPROM as may be needed. Further, in case of altering or revising the communication protocols after the system has been finished up, the protocol processing program can be rewritten in conformity with the alteration or revision as the operation of the system.

Although not especially restricted, the protocol processing program to be stored in the EPROM 10 is configured of a group of microinstructions. Although no special restriction is intended, the microinstruction is formed with a microcode and several information fields in the number of bits in which each of various processes such as arithmetic and logic operations and data transfers can be executed in a fixed cycle or a fixed number of steps.

The EPROM 10 is accessed by the CPU 9, and the predetermined microinstruction thus read out is supplied to the CPU 9 through a specific instruction bus 19.

Although not especially restricted, the CPU 9 includes therein a microaddress controller which serves to access the EPROM 10, a microinstruction decoder which decodes the microinstruction supplied from the EPROM 10, an execution unit which executes the microinstruction on the basis of the output control signal of the microinstruction decoder, a bus interface unit which is coupled to a common internal bus 5, an interrupt controller which controls an interrupt operation, etc. Thus, the CPU 9 executes the data transmission control conforming to the predetermined communication protocol, in compliance with the microinstruction supplied from the EPROM 10.

Although no special restriction is meant, the circuit control unit 6 subjects serial data received from the reception line RL, to bit synchronization and character synchronization and then to deserialization, and executes a predetermined operation for detecting a transmission error, and it instructs the CPU 9 to execute a predetermined interrupt process in accordance with the sort of the received data or a received frame. On the other hand, in sending data, the circuit control unit 6 affixes a transmission error detecting code, etc. to the data or a frame to-be-sent and sends the data from the transmission line TL while subjecting the data or the frame to serialization and to bit synchronization and character synchronization.

The host interface 7 is utilized when the host processor 4 issues a command to the communication LSI 2 or reads a status corresponding to the internal state of the communication control LSI 2.

The DMAC 1 performs the data transfer control for storing the predetermined field of the received data or received frame processed by the circuit control unit 6, into the main memory 3, and it performs the control of transferring data stored in the main memory 3, to the circuit control unit 6 in order to transmit the data. Further, the DMAC 1 performs the control of transferring various parameters and table constituting data required for the communication protocol process and information for the data transfer control by this DMAC 1, between the main memory 3 and the RAM 8.

Although no special restriction is meant, a specific DMA-transfer bus 11 which couples the DMAC 1 and the circuit control unit 6 is used for the data transfer between the circuit control unit 6 and the main memory 3 as is based on the control of the DMAC 1. Thus, when the data transfer between the circuit control unit 6 and the main memory 3 is conducted by the access control of the DMAC 1, the common internal bus 5 is not occupied by the DMA transfer, and the CPU 9 can utilize the common internal bus 5 as needed by the communication protocol process during such DMA transfer.

Although no special restriction is intended, a data buffer of the first-in first-out type (hereinbelow, simply expressed as "FiFo") 18 is disposed in the specific DMA-transfer bus 11 laid between the circuit control unit 6 and the DMAC 1, so as to absorb or buffer the difference between the rate of the data transfer under the control of the DMAC 1 and the rate of the data transmission or reception by the circuit control unit 6.

In a case where the control procedure of the HDLC series, for example, is adopted in such a communication control LSI 2, the circuit control unit 6 decodes the data or frame supplied thereto and carries forward the processing of an address contained therein and information contained in a control field, and it loads the FiFo 18 with information constituting the frame, namely, the information of the received frame or information to-be-transmitted transferred from the main memory 3 to this circuit control unit 6 via the DMAC 1.

On this occasion, the circuit control unit 6 applies various interrupts to the CPU 9 in accordance with the address, the information contained in the control field, etc. The CPU 9 generates a vector corresponding to the sort of the interrupt at that time and branches the control procedure. By way of example, in the case of the reception of the information frame, a frame check sequence and the result of the operation for the error detection are checked. Thus, subject to the normal reception, the DMAC 1 is started, and the information field of the received data loaded in the FiFo 18 is transferred to the main memory 3 via the DMAC 1. On the other hand, in the case of the transmission of the information frame, the frame is originated by affixing an address field, a control field, a frame start flag, a frame check sequence and a frame end flag to the information field loaded in the FiFo 18 via the DMAC 1, and it is sent from the circuit control unit 6.

Next, the details of the DMAC 1 will be described.

The DMAC 1 of this embodiment is constructed of a transfer control unit 13 and a register unit 14. The register unit 14 comprises a first channel 15 for transferring the data received by the circuit control unit 6, to the main memory 3, a second channel 16 for transferring the data to-be-transmitted from the main memory 3 to the circuit control unit 6, and a third channel 17 for transferring the data between the main memory 3 and the RAM 8.

As data transfer control registers corresponding to the first channel 15, there are provided a status register 151 which indicates the propriety of the data transfer in this channel by the use of an enable bit or disenable bit, a byte count register 152 in which the number of data transfer bytes is set, an address register 153 in which the head address of a transfer goal is stored, a rewritable burst-number register 154 in which the number of bytes of continuous data transfers in the first channel 15 based on a burst mode can be freely set on occasion, and a burst-number compare register 155 to be described later. Likewise, data transfer control registers corresponding to the second channel 16 are a status register 161 which indicates the propriety of the data transfer in this channel by the use of an enable bit or disenable bit, a byte count register 162 in which the number of data transfer bytes is set, an address register 163 in which the head address of a transfer origin is stored, a rewritable burst-number register 164 in which the number of bytes of continuous data transfers in the second channel 16 based on the burst mode can be freely set on occasion, and a burst-number compare register 165 to be described later. Further, data transfer control registers corresponding to the third channel 17 are a mode register 170 which indicates the direction of the data transfer, a status register 171 which indicates the propriety of the data transfer in this channel by the use of an enable bit or disenable bit, a byte counter register 172 in which the number of data transfer bytes is set, an address register 173 in which the head address of the transfer origin and that of the transfer goal are stored, a rewritable burst-number register 174 in which the number of bytes of continuous data transfers in the third channel 17 based on the burst mode can be freely set on occasion, and a burst-number compare register 175 to be described later.

Data items are set in the various data transfer control registers provided in correspondence with the respective channels 15–17, by the CPU 9 on the basis of interrupts applied from the circuit control unit 6 and commands given by the host processor 4.

When the enable bits are set in the status registers 151, 161 and 171, channel request signals $CREQ_1$, $CREQ_2$ and $CREQ_3$ corresponding to the respective channels 15, 16 and 17 are asserted.

Each of the byte count registers 152, 162 and 172 corresponding to the respective channels 15, 16 and 17 has its set value decremented by a decrementer, not shown, each time the data transfer operation of 1 byte in the corresponding channel is performed. When the byte count register 152, 162 or 172 is decremented and brought back into its clear status, the enable bit of the corresponding status register 151, 161 or 171 is reset, and the corresponding channel request signal $CREQ_1$, $CREQ_2$ or $CREQ_3$ is responsively negated.

The set values of the burst-number registers 154, 164 and 174 are respectively compared with the values of the burst-number compare registers 155, 165 and 175. Each of the burst-number compare registers is cleared by the start of the data transfer operation in the corresponding channel. In addition, the burst-number compare register has its value incremented each time an address strobe signal $\overline{AS}$ which is supplied from the transfer control unit 13 changes, for example, from a high level to a low level. That is, the burst-number compare register has its value incremented each time the corresponding channel transfers the data of 1 byte. In a case where, in spite of the agreement of the value of this burst-number compare register with the value of the corresponding burst-number register, the corresponding byte count register does not reach the clear status, the corresponding channel request signal $CREQ_1$, $CREQ_2$ or $CREQ_3$ is once negated and is thereafter asserted again.

Each of the address registers 153, 163 and 173 has its set value incremented by an incrementer, not shown, each time the data transfer operation of 1 byte in the corresponding channel is performed. Thus, the address register holds on a next address.

All of the channel request signals $CREQ_1$, $CREQ_2$ and $CREQ_3$ are supplied to the transfer control unit 13. When any of the channel request signals $CREQ_1$, $CREQ_2$ and $CREQ_3$ is asserted, the transfer control unit 13 responsively asserts a bus request signal BREQ and requests the host processor 4 to release a bus mastership. After having ended a memory cycle under execution, the host processor 4 asserts a bus acknowledge signal BACK thereby to abandon the bus mastership. The transfer control unit 13 thus having acquired the bus mastership asserts any of channel acknowledge signals corresponding to the respective channels and instructs the predetermined channel to start the data transfer operation. On this occasion, when the plurality of channel request signals are asserted, a priority control is performed according to the earliness of the assert timings of the signals so as to assert the channel acknowledge signal for the channel of higher priority level though no special restriction is meant.

While keeping the bus mastership once acquired, the transfer control unit 13 can perform the continuous data transfers extending over at least two of the channels. More specifically, the transfer control unit 13 comprises a total-burst-number register 131 for prescribing the number of bytes of the continuous data transfers over the plurality of channels, and a total-burst-number compare register 132 to be described later. A total burst number is initially set in the total-burst-number register 131 by the CPU 9. This set value is compared with the value of the total-burst-number compare register 132. The total-burst-number compare register 132 is cleared in response to the fact that the transfer control unit 13 has acquired the bus mastership and caused any of the channels to start the data transfer operation. In addition, the total-burst-number compare register 132 has its value incremented each time the address strobe signal $\overline{AS}$ which is output from the transfer control unit 13 changes, for example, from the high level to the low level. That is, the total-burst-number compare register 132 has its value incremented each time any channel transfers data of 1 byte. After having acquired the bus mastership, the transfer control unit 13 abandons this bus mastership in a case where all the channel request signals $CREQ_1$, $CREQ_2$ and $CREQ_3$ are brought into the negated statuses, or in a case where the value of the total-burst-number compare register 132 agrees with that of the total-burst-number register 131.

Accordingly, the transfer control unit 13 asserts the bus request signal BREQ in a case where one of the channel request signals has been asserted. Then, when the value of the burst-number compare register of the channel of the channel request signal has agreed with the set value of the corresponding burst-number register, or when the byte count register corresponding to the pertinent channel has been cleared to zero, the channel request signal is negated, so that the transfer control unit 13 negates the bus request signal BREQ, namely, abandons the bus mastership. Besides, the transfer control unit 13 asserts the bus request signal BREQ in a case where two or more of the channel request signals have been asserted. Then, even when that one of the channels of the channel request signals which has first started the data transfer operation on the basis of the priority control has negated the channel request signal of the pertinent channel, the transfer control unit 13 maintains the bus request signal BREQ in the asserted status, namely, it does not abandon the bus mastership as long as the channel request signal of the asserted status in any other channel is supplied. Thus, the transfer control unit 13 shifts to the data transfer operation in the next channel while keeping the bus mastership. In this manner, the series of data transfer operations extending over the plurality of channels are allowed during one interval of the bus mastership acquisition until, to the utmost, the value of the total-burst-number compare register 132 comes into agreement with the set value of the total-burst-number register 131.

Now, there will be described the series of data transfer operations over the plurality of channels as performed by the DMAC 1.

In the case where the communication control LSI 2 receives data from the reception line $RI_i$, the received data is converted by the circuit control unit 6 into parallel data, which is loaded in the internal FiFo 18, and an interrupt significant of the data reception is applied to the CPU 9. Thus, the CPU 9 sets various control information items required for the data transfer control which is performed through the first channel 15 of the DMAC 1. That is, the CPU 9 sets the number of data transfer bytes in the byte count register 152, it stores the head address of a transfer goal in the main memory 3, into the address register 153, and it sets the enable bit in the status register 151. Although no special restriction is intended, the operation of setting the number of bytes of the continuous data transfers in the first channel 15, in the burst-number register 154 is carried out at the start of the system, and the value is held constant.

In the case where data is transmitted from the transmission line TL of the communication control LSI 2, the host processor 4 stores the data to-be-transmitted in the main memory 3 beforehand and then gives the CPU 9 a command instructive of the data transmission. In executing the command, the CPU 9 sets various control information items required for the data transfer control which is performed through the second channel 16 of the DMAC 1. That is, the CPU 9 sets the number of data transfer bytes in the byte count register 162, it stores the head address of a transfer origin in the main memory 3, into the address register 163, and it sets the enable bit in the status register 161. Although no special restriction is intended, the operation of setting the number of bytes of the continuous data transfers in the second channel 16, in the burst-number register 164 is carried out at the start of the system, and the value is held constant.

In the case where various parameters, control information items, etc. required for the transmissions or reception of data through the circuit control unit 6 are transferred between the RAM 8 and the main memory 3, the host processor 4 gives the CPU 9 a command necessary for the data transfer. In executing the command, the CPU 9 sets various control information items required for the data transfer control which is performed through the third channel 17 of the DMAC 1. That is, the CPU 9 sets the number of data transfer bytes in the byte count register 172 and data indicative of the direction of the data transfer in the mode register 170, it stores the head address of the transfer origin and that of the transfer goal in the address register 173, and it sets the enable bit in the status register 171. Although no special restriction is intended, the operation of setting the number of bytes of the continuous data transfers in the third channel 17, in the burst-number register 174 is carried out at the start of the system, and the value is held constant.

In the total-burst-number register 131 included in the transfer control unit 13, data responsive to 8 bytes is set at the start of the system though not especially restricted.

Here, the following description of operations shall be centered on a case where the enable bits are set in the respective status registers 151, 161 and 171 one after another, whereby the three channels 15-17 are successively instructed to perform the data transfer operations.

Figure 2:
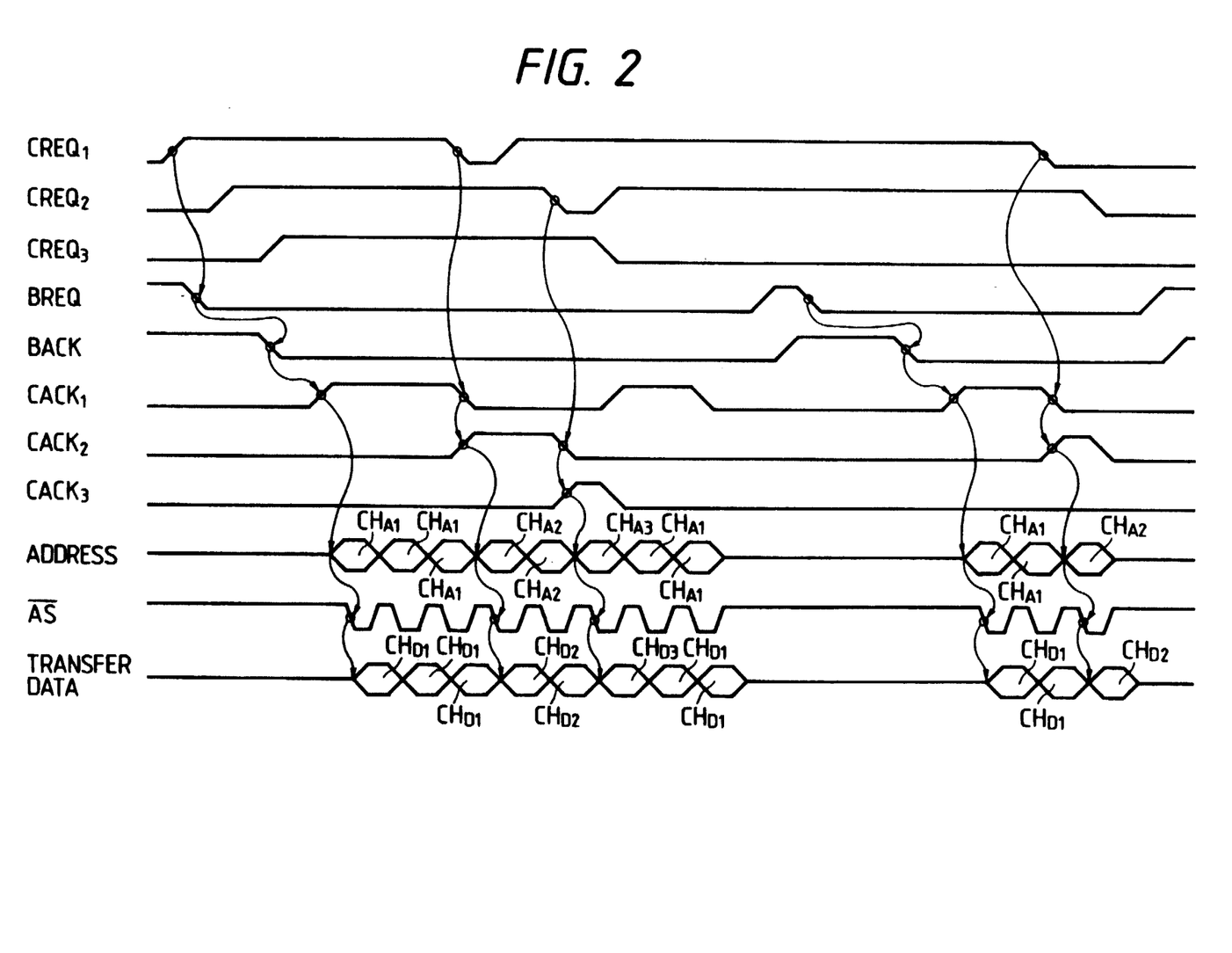
FIG. 2 a time chart for explaining those series of data transfer operations over a plurality of channels which are performed by the direct memory access controller in FIG. 1.

By way of example, it is assumed that the operations of setting the enable bits are conducted in the order of the status registers 151, 161 and 171 as illustrated in FIG. 2. In accordance with this order, therefore, the channel request signals $CREQ_1$, $CREQ_2$ and $CREQ_3$ are asserted (from the low level to the high level) and are applied to the transfer control unit 13. The transfer control unit 13 responsively asserts the bus request signal BREQ (from the high level to the low level) and requests the host processor 4 to give the bus mastership. When, in compliance with this request, the host processor 4 asserts the bus acknowledge signal BACK (from the high level to the low level) to abandon the bus mastership, the transfer control unit 13 asserts the channel acknowledge signal $CACK_1$ (from the low level to the high level) corresponding to the channel request signal $CREQ_1$ first asserted on that occasion, on the basis of the priority control conforming to the earliness of the assert timings of the channel request signals $CREQ_1$, $CREQ_2$ and $CREQ_3$. The first channel 15 supplies the main memory 3 with data $CHD_1$ received by the circuit control unit 6 and the transfer goal address signal $CH_{A1}$ of reception data $CH_{D1}$ stored in the address register 153. The main memory 3 accepts the reception data $CH_{D1}$ when the address strobe signal $\overline{AS}$ supplied from the transfer control unit 13 changes from the high level to the low level.

At this time, it is assumed that data corresponding to 7 bytes is set in the byte count register 152 of the first channel 15, while data corresponding to 3 bytes is set in the burst-number register 154. Then, when the received data of the circuit control unit 6 has been transferred to the main memory 3 to the amount of 3 bytes by utilizing the first channel 15, the value of the burst-number compare register 155 agrees with the set value of the burst-number register 154. Therefore, the channel request signal $CREQ_1$ is negated (from the high level to the low level), and the channel acknowledge signal $CACK_1$ is responsively negated (from the high level to the low level), whereby the data transfer operation in the first channel 15 is once ended. Thereafter, this channel 15 asserts the channel request signal $CREQ_1$ (from the low level to the high level) again in order to perform the remaining data transfers.

When the data transfer in the first channel 15 is started after the acquisition of the bus mastership by the transfer control unit 13, the total-burst-number compare register 132 is sequentially incremented from the clear status each time data of 1 byte is transferred (each time the address strobe signal $\overline{AS}$ changes), and if the value of this register 132 reaches that of the total-burst-number register 131, is discriminated by the transfer control unit 13. When the channel request signal $CREQ_1$ has been once negated as stated above, the value of the total-burst-number compare register 132 does not reach 8 bytes being the set value of the total-burst-number register 131. Therefore, the transfer control unit 13 does not abandon the bus mastership at that time, but it now gives priority to the channel request signal $CREQ_2$ on the basis of the priority control and asserts the channel acknowledge signal $CACK_2$ corresponding to the channel request signal $CREQ_2$ (from the low level to the high level). Thus, the data transfer in the second channel 16 is started subsequently to that in the first channel 15.

On this occasion, it is assumed that data corresponding to 3 bytes is set in the byte count register 162 in the second channel 16, while data corresponding to 2 bytes is set in the burst-number register 164. The CPU 9 sets the address signal $CH_{A2}$ of data to-be-transmitted stored in the main memory 3, in the address register 163 of the second channel 16. Then, the second channel 16 supplies the address signal $CH_{A2}$ to the main memory 3 in order that the data $CH_{D2}$ to be transmitted from the circuit control unit 6 may be fetched from the main memory 3. The main memory 3 delivers the transmission data $CH_{D2}$ to the circuit control unit 6 when the address strobe signal $\overline{AS}$ which is supplied from the transfer control unit 13 changes from the high level to the low level. When the second channel 16 has transferred 2 bytes from the main memory 3 to the circuit control unit 6, the value of the burst-number compare register 165 agrees with the set value of the burst-number register 164. Therefore, the channel request signal $CREQ_2$ is once negated (from the high level to the low level), and the channel acknowledge signal $CACK_2$ is responsively negated (from the high level to the low level). Thus, the data transfer operation in the second channel 16 is once ended, and the channel request signal $CREQ_2$ is asserted (from the low level to the high level) again in order to perform the remaining data transfers in the second channel 16.

When the channel request signal $CREQ_2$ has been once negated in this manner, the value of the total-burst-number compare register 132 does not reach 8 bytes being the set value of the total-burst-number register 131. Therefore, the transfer control unit 13 does not abandon the bus mastership at that time, but it now gives priority to the channel request signal $CREQ_3$ on the basis of the priority control and asserts the channel acknowledge signal $CACK_3$ corresponding to the channel request signal $CREQ_3$ (from the low level to the high level). Thus, the data transfer in the third channel 17 is started subsequently to those in the first channel 15 and second channel 17.

On this occasion, it is assumed that data corresponding to 1 byte is set in the byte count register 172 in the third channel 17, while data corresponding to 2 bytes is set in the burst-number register 174. When the data transfer of 1 byte has been performed between the main memory 3 and the RAM 8 by utilizing the third channel 17, the byte count register 172 is cleared to zero. Therefore, the channel request signal $CREQ_3$ is negated (from the high level to the low level), and the channel acknowledge signal $CACK_3$ is responsively negated (from the high level to the low level), whereby the data transfer operation in this channel 17 is ended.

When the channel request signal $CREQ_3$ has been negated in this manner, the value of the total-burst-number compare register 132 does not reach 8 bytes being the set value of the total-burst-number register 131. Therefore, the transfer control unit 13 does not abandon the bus mastership at that time, but it gives priority to the channel request signal $CREQ_1$ again on the basis of the priority control and asserts the channel acknowledge signal $CACK_1$ as in the first operation. Thus, the data transfer in the first channel 15 is started again subsequently to those in the first channel 15, second channel 16 and third channel 17.

When the data transfer in the first channel 15 at this time has been performed to the amount of 2 bytes, the value of the total-burst-number compare register 132 reaches 8 bytes being the set value of the total-burst-number register 131. Therefore, the transfer control unit 13 negates the channel acknowledge signal $CACK_1$ so as to stop the data transfer operation of the third byte in the first channel 15. Subsequently, the transfer control unit 13 negates the bus request signal BREQ (from the low level to the high level) so as to once abandon the bus mastership. Thus, the continuous data transfers extending over the plurality of channels as based on the bus mastership first acquired are completely ended with the 8 bytes prescribed by the set value of the total-burst-number register 131.

When the bus mastership has been abandoned in this way, the value responsive to 2 bytes remains in the byte count register 152 in the first channel 15, and the value responsive to 1 byte remains in the byte count register 162 in the second channel 16. Therefore, the channel request signals $CREQ_1$ and $CREQ_2$ keep the asserted statuses as they are. Accordingly, the transfer control unit 13 asserts the bus request signal BREQ (from the high level to the low level) again and requests the host processor 4 to abandon the bus mastership. When, in compliance with this request, the host processor 4 asserts the bus acknowledge signal BACK (from the high level to the low level) to abandon the bus mastership, the transfer control unit 13 asserts the channel acknowledge signal $CACK_1$ corresponding to the channel request signal $CREQ_1$ in accordance with the priority control thereof. Then, the data transfer which is conducted through the first channel 15 is started again. When the data transfer in the first channel 15 has been carried out to the amount of 2 bytes, the byte count register 152 is cleared, with the result that the data transfer in the first channel is ended in response to the negation of the channel request signal $CREQ_1$. When the channel request signal $CREQ_1$ has been negated, the channel request signal $CREQ_2$ of the second channel 16 is in the asserted status, and besides, the value of the total-burst-number compare register 132 does not reach that of the total-burst-number register 131. Therefore, the transfer control unit 13 does not abandon the bus mastership, but it gives priority to the channel request signal $CREQ_2$ and causes the second channel 16 to start the data transfer. When the data transfer in the second channel 16 has been performed to the amount of 1 byte, the byte count register 162 is cleared, with the result that the data transfer in the second channel 16 is ended in response to the negation of the channel request signal $CREQ_2$. According to this embodiment, when the channel request signal $CREQ_2$ is negated, there is no channel request signal asserted, and the transfer control unit 13 responsively negates the bus request signal BREQ so as to abandon the bus mastership.

Figure 3:
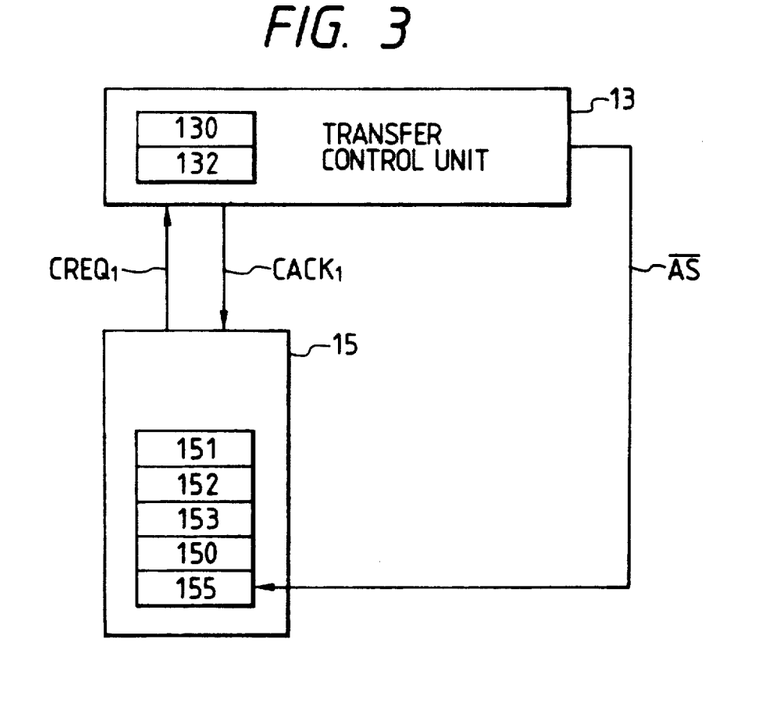
FIG. 3 is a block diagram of a system including a direct memory access controller which is another embodiment of the data transfer controller according to the present invention.

FIG. 3 is a system block diagram showing a direct memory access controller which is another embodiment of the data transfer controller according to the present invention. In the system block diagram, components to which the same symbols as in FIG. 1 are assigned have been explained in the embodiment of FIG. 1, so that they shall not be repeatedly described here. In addition, regarding the second channel and the third channel, only the part of a burst-number register differs as in the first channel. Accordingly, the first channel 15 is typically illustrated here.

The burst-number register 150 which the first channel 15 owns and in which the number of bytes of continuous data transfers in a burst mode is constructed of a nonvolatile memory such as ROM (read only memory). Accordingly, the number of bytes of the continuous data transfers is set in the burst-number register 150 beforehand, and the first channel 15 transfers reception data received by the circuit control unit 6, to the main memory 3 in accordance with the set value.

A total-burst-number register 130 which the transfer control unit 13 owns and which prescribes the number of bytes of continuous data transfers extending over a plurality of channels, is also constructed of a nonvolatile memory such as ROM. Accordingly, the number of bytes of the continuous data transfers of the plurality of channels is set in the total-burst-number register 130 beforehand, and the transfer control unit 13 does not abandon a bus mastership until the value of the total-burst-number compare register 132 agrees with the set value of the total-burst-number register 130 or until channel request signals from the respective channels are negated.

According to the foregoing embodiments, the following functional effects are attained:

(1) A DMAC 1 acquires a bus mastership in response to any of the statuses of individual channels capable of transferring data, namely, the set statuses of enable bits, whereupon the maximum number of words of continuous data transfers in each individual channel is controlled in accordance with the set value of a corresponding burst-number register, and when the statuses of two or more of the channels capable of transferring data are indicated, the number of words of a series of data transfers extending over the plurality of channels is collectively supervised and the abandonment of the bus mastership is controlled so as to maintain the bus mastership until, to the utmost, the number of words of the continuous data transfers after the acquisition of the bus mastership reaches the set value of a total-burst-number register, whereby the continuous data transfers over the plurality of channels are permitted, and an enhanced data transfer efficiency is achieved.

(2) In a system which includes a communication control LSI as in each of the embodiments and in which relevant data items must be transferred over a plurality of channels, it is required to fetch from a main memory 3 control information items necessary for the transmission and reception controls of data through a circuit control unit 6, address information items necessary for data transfer controls, etc., and it is also required to execute a transmission process in accordance with a received content. Accordingly, cases occur frequently where the operations of transferring the various control information items and transmission and reception data items from the main memory 3 to a RAM 8 and transferring the received data to the main memory 3 correlate to each other. When, on such an occasion, the data transfers can be continuously performed over the plurality of channels as in each of the embodiments, the throughput of the system can be remarkably enhanced. In this case, a DMAC 1 occupies a bus, to the utmost, for a period of time during which the data items are transferred in the number of bytes set in a total-burst-number register, and it does not hold a bus mastership unlimitedly long. Therefore, it is not apprehended that the activity rate of a host processor 4 will lower conversly.

(3) In particularly, by adopting burst-number registers and a total-burst-number register which are rewritable, the number of words of continuous data transfers extending over a plurality of channels can be altered at will, and the flexibility of a system can be increased. By way of example, regarding the burst-number registers, in order to prevent a reception overrun, the burst number of the first channel 15 for transferring reception data may be set large. Besides, in a system in which the underrun of transmission becomes critical, the burst number of the second channel 16 for transferring transmission data may be set large.

(4) When a specific DMA-transfer bus 11 which couples a circuit control unit 6 and a DMAC 1 is employed for a data transfer which is carried out between the circuit control unit 6 and a main memory 3 under the control of the DMAC 1, a common internal bus 5 is not occupied in the case of such a data transfer, and a CPU 9 can utilized the common internal bus 5 as needed by a communication protocol process during the DMA transfer. Accordingly, even when the frequence of data transfers by the DMAC 1 becomes very high as to the nature of a communication control LSI, this condition can be prevented from forming an obstacle to the communication protocol process of the CPU 9, and the measure of this item (4) can contribute to the enhancement of the system efficiency as in the foregoing.

Although, in the above, the invention made by the inventor has been concretely described in conjunction with embodiments, the present invention is not restricted thereto but can be variously altered within a scope not departing from the purport thereof.

By way of example, although each of the embodiments has set the number of channels at 3 and has provided a single total-burst-number register, the present invention is not restricted thereto but can properly change the numbers of the channels and such total-burst-number registers. For example, in case of setting the number of channels at 10, it is possible to put the first to fifth channels under the control of the first total-burst-number register and to put the sixth to tenth channels under the control of the second total-burst-number register.

In addition, the rewrite timings of rewritable burst-number registers and total-burst-number register described in one of the embodiments are not restricted to the time of the start of a system, but the rewrite operations may well be performed appropriately when control information items for channels are set.

Moreover, in each of the embodiments, a priority control for respective channel request signals has been performed on the basis of the earliness of the assert timings of the signals, but it may well be performed on the basis of priority levels which are set for respective channels beforehand.

Although, in the above, the invention made by the inventor has been chiefly described as to the case of application to a single-chip communication control LSI forming the background field of utilization, the present invention is not restricted thereto but is applicable to various semiconductor integrated circuits including a DMAC as a single device, a single-chip microcomputer, etc. The present invention can be applied to any device having, at least, the condition of a data transfer control function for a plurality of channels.

Effects which are attained by typical aspects of performance of the present invention will be briefly described below:

The numbers of words of continuous data transfers in individual channels are respectively controlled on the basis of the set values of burst-number registers, and a bus mastership is maintained for any other channel in a status capable of transferring data, until the number of words of continuous data transfers after the acquisition of the bus mastership reaches the set value of a total-burst-number register, thereby to bring forth the effect that the continuous data transfers extending over the plurality of channels are permitted, so a data transfer efficiency can be enhanced.

In addition, burst-number registers and a total-burst-number register which are, rewritable are adopted, thereby to bring forth the effects that the number of words of continuous data transfers extending over a plurality of channels can be altered at will, and that the flexibility of a system can be increased.

Moreover, with a measure in which a data transfer controller is included in a communication control LSI having a circuit control unit and a central processing unit and is coupled to the circuit control unit by a specific data transfer bus, even when the frequence of the transfers of transmission/reception data by the data transfer controller becomes very high on account of the nature of the communication control LSI, this condition can be prevented from forming obstacles to a communication protocol process, etc. of the built-in central processing unit, and the measure can contribute to the enhancement of a system efficiency.

What is claimed is:

1. A data transfer controller for use with a processor which provides a bus acknowledge signal to said data transfer controller in response to reception of a bus request signal from said data transfer controller, said data transfer controller comprising:
  a first data transfer channel including first register means for storing therein information relating to a transfer of data from said first data transfer channel, wherein said first register means includes i) a first burst-number register for storing a first value defining the number of continuous data transfers in a burst mode and ii) an address register for storing an address corresponding to the data transfer of said first data transfer channel, the first data transfer channel generating a first data transfer request signal when the first data transfer channel requests the transfer of the data;

a second data transfer channel including second register means for storing therein information relating to a transfer of data from said second data transfer channel, said second register means includes i) a second burst-number register for storing a value defining the number of continuous data transfers in the burst mode and ii) an address register for storing an address relating to the data transfer of said second data transfer channel, the second data transfer channel generating a second data transfer request signal when the second data transfer channel requests the transfer of the data thereof; and control means coupled to the first and second data transfer channels for controlling said data transfers of said first and second data transfer channels, the control means providing said bus request signal when receiving said first or second data transfer request signals generated by said receiving first or second data transfer channels and providing a data transfer acknowledge signal to the data transfer channel which provides said data transfer request signal to start the data transfer in the burst mode, the data transfer of the corresponding data transfer channel occurring in response to the reception of said bus acknowledge signal, said control means further including a total-burst-number register which stores a predetermined value defining the total number of data transfers to be performed by said first and second data transfer channels in the burst mode, and a compare register which stores a value that is obtained by counting the respective data transfers performed by said first and second data transfer channels in the burst mode, wherein each of said first and second data transfer channels performs its data transfers until the number of data transfers thereof come into agreement with the value stored in the corresponding burst-number register, wherein said control means which has received said bus acknowledge signal controls said first and second data transfer channels so that the data transfer of said first data transfer channel and the data transfer of said second data transfer channel are continuously performed, and wherein said control means permits the data transfers performed by said first and second data transfer channels until said counted value in said compare register comes into agreement with the predetermined value in said total-burst-number register.

2. A data transfer controller according to claim 1, wherein each of said first and second register means further includes:

a status register in which data indicative of a data transfer enable status of the corresponding data transfer channel is set, wherein the corresponding data transfer channel generates said data transfer request signal to the control means when the data is set in the status register, a byte counter register for storing the number of bytes of data to be transferred by the corresponding data transfer channel, and a burst-number compare register which stores a value that is obtained by counting the respective data transfers by the corresponding data transfer channel, wherein the corresponding data transfer channel negates said data transfer request signal when the counted value in the burst-number compare register comes into agreement with the value in the burst-number register.

3. An integrated data transfer controller for use with a host processor, the integrated data transfer controller having a plurality of data transfer channels and the controller also providing a bus request signal to the host processor to request acquisition of bus mastership from the host processor and acquiring the bus mastership upon receiving a bus acknowledge signal from the host processor, the integrated data transfer controller comprising:

burst-number registers for respectively storing predetermined value defining the number of data transfers in the individual data transfer channels; and a transfer control means including,
total-burst-number register means for storing a predetermined value defining the number of continuous data transfers extending over at least two of the plurality of data transfer channels, wherein the transfer control means provides the bus request signal to acquire the bus membership upon receiving a signal representative of data transfer enable status of one of the plurality of data transfer channels, wherein the transfer control means controls the number of the continuous data transfers in the individual data transfer channels on the basis of the values set in each of the burst-number registers, respectively, and wherein the transfer control means maintains the bus mastership for other data transfer channels which are in the data transfer enable status until the number of the continuous data transfers after the acquisition of the bus mastership, reaches the value set in of the total-burst-number register.

4. A communication control device for use with a host processor providing a bus acknowledge signal to the communication control device upon receiving a bus request signal from the communication control device, and a main memory, the communication control device comprising:

a central processing unit for executing protocol processing;

a data memory for storing control data for the central processing unit therein;

a circuit control unit for receiving and transmitting serial data to and from the communication control device the circuit control unit receiving serial data from external devices;

data buffer means coupled to the circuit control unit and for storing received data and data to be transmitted therein; and a direct memory access controller coupled to the data memory, to the data buffer means and to the main memory, the direct memory access controller having a first channel for transferring the data in the data buffer means to the main memory, a second channel for transferring data in the main memory to the data buffer means as the data to be transmitted and a third channel for transferring data between the data memory and the main memory, each of the first, second, and third channels having, a status register in which status data indicative of data transfer enable status of the individual channels is selectively set, wherein each of the first, second, and third channels provides a request signal when the status is set into the corresponding status register, and a burst-number register for respectively storing predetermined values defining the number of data transfer words in the individual channels, the direct memory access controller further including a transfer control unit having, total-burst-number register means for storing a predetermined value defining the number of continuous data transfers extending over at least two of the first, second, and third channels, wherein the transfer control unit provides the bus request signal to acquire the burst mastership upon receiving at least one request signal from one of the first to third channels, wherein the transfer control unit controls the number of the continuous data transfers in the individual channels on the basis of the values of set in each of the burst-number registers, respectively, and wherein the transfer control unit maintains the burst mastership one acquired for other channels providing the request signal until the numbers of the continuous data transfers after the acquisition of the bus mastership, reaches the value set in the total-burst-number register.

5. A method of transferring data in a data communication system including a processor and a direct memory access controller having a plurality of channels, the method comprising the steps of:

storing a predetermined value in a total-burst-number register in a data transfer control means of the direct memory access controller;

setting predetermined values in burst-number registers which are part of and correspond to the plurality of channels;

providing data transfer request signals from ones of the plurality of channels to the data transfer control means;

generating a bus request signal from the data transfer control means to the processor in response to the reception of at least one of the data transfer request signals;

in response to reception of the bus request signal, supplying a bus acknowledge signal from the processor to the data transfer control means, whereby the direct memory access controller acquires bus mastership;

enabling a data transfer operation of one of the channels providing the data transfer request signals by the data transfer control means until the number of data transfer words reaches the predetermined value in the burst-number register of the one channel;

continuously enabling a data transfer operation of the other channel providing the data transfer request signal by the data transfer control means while the data transfer control means maintains the bus membership once acquired, if the total number of the continuous data transfers, after the acquisition of the bus mastership do not reach the predetermined value of the total-burst-number register; and abandoning the bus mastership from the direct memory access controller when the total number of the continuous data transfers, after the acquisition of the bus mastership, reaches the predetermined value set in the total-burst-number register.

6. A method for controlling communication in a computer system which includes a host processor, a main memory and a communication control device each interconnected through a bus, the communication control device further including a control processing unit, a data memory, a circuit control unit, a data buffer, and a direct memory access controller coupled to the data memory, the data buffer and the main memory, the direct memory access controller including a first channel, a second channel and a third channel, each of the channels in turn including a status register and a burst-number register, the direct memory access controller also including a transfer control unit having a total-burst-number register, the method comprising the steps of:

executing protocol processing of the communication control device by the central processing unit;

storing control data for use by the central processing unit in the data memory;

transferring serial data to and from the communication control device through the circuit control unit;

buffering transferring of data flowing between the circuit control unit and the direct memory access controller with the data buffer, so as to absorb differences between the rate of data transfer under the control of the direct memory access controller;

transferring the data in the data buffer to the main memory through the first channel to the direct memory access controller;

transferring data in the main memory to the data buffer through the second channel to the direct memory access controller;

transferring data between the data memory and the main memory through the third channel of the direct memory access controller;

setting in the status register of each of the channels status data indicative of a data transfer enable status of each channel, wherein each of the channels provides a request signal when the status data is set into the corresponding status register;

storing a predetermined value in the burst-number register of each of the channels, the predetermined value defining the number of data transfers in the respective channel;

storing a predetermined value in the total-burst-number register of the transfer control unit, the predetermined value defining the number of continuous data transfers extending over at least two of the first, second, and third channels;

issuing a burst request signal from the transfer control unit to the host processor to acquire bus mastership, upon receipt of a corresponding request signal from at least one of the first, second, and third channels;

controlling by the transfer control unit the number of continuous data transfers in the individual channels on the basis of the predetermined value set in the corresponding burst-number register; and maintaining control of bus mastership by the transfer control unit for other channels than a first requesting channel, until the number of continuous data transfers, after the acquisition of the bus mastership, reaches the predetermined value set in the total-burst-number register.

* * * * *

UNITED STATES PATENT AND TRADEMARK OFFICE
CERTIFICATE OF CORRECTION

PATENT NO. : 5,179,663
DATED : January 12, 1993
INVENTOR(S) : Kenji Iimura

It is certified that error appears in the above-identified patent and that said Letters Patent is hereby corrected as shown below:

Claim 3, column 16, line 22, delete "value" and substitute therefor --values--.

Claim 3, column 16, line 30, delete "membership" and substitute therefor --mastership--.

Claim 3, column 16, line 44, delete "of".

Claim 4, column 17, lines 26-27, delete "burst mastership one" and substitute therefor --bus mastership once--.

Claim 5, column 17, lines 63-64, delete "membership" and substitute therefor --mastership--.

Signed and Sealed this

Twenty-sixth Day of October, 1993

Attest:

BRUCE LEHMAN

*Attesting Officer*   *Commissioner of Patents and Trademarks*